(12) United States Patent
Choi

(10) Patent No.: US 12,406,361 B2
(45) Date of Patent: Sep. 2, 2025

(54) ELECTRONIC DEVICE AND METHOD FOR PROCESSING SCANNED IMAGE OF THREE DIMENSIONAL SCANNER

(71) Applicant: MEDIT CORP., Seoul (KR)

(72) Inventor: Won Hoon Choi, Seoul (KR)

(73) Assignee: MEDIT CORP., Seoul (KR)

( * ) Notice: Subject to any disclaimer, the term of this patent is extended or adjusted under 35 U.S.C. 154(b) by 457 days.

(21) Appl. No.: 17/940,506

(22) Filed: Sep. 8, 2022

(65) Prior Publication Data

US 2023/0096570 A1     Mar. 30, 2023

(30) Foreign Application Priority Data

Sep. 13, 2021    (KR) ........................ 10-2021-0121658

(51) Int. Cl.
    *G06T 7/12*       (2017.01)
    *G06T 7/00*       (2017.01)
    *G06T 7/33*       (2017.01)

(52) U.S. Cl.
    CPC .............. *G06T 7/0012* (2013.01); *G06T 7/33* (2017.01); *G06T 2207/20221* (2013.01); *G06T 2207/30036* (2013.01)

(58) Field of Classification Search
    CPC ................................ G06T 7/0012; G06T 7/33
    USPC ....................................................... 382/128
    See application file for complete search history.

(56) References Cited

U.S. PATENT DOCUMENTS

2005/0283065 A1* 12/2005 Babayoff ............... H04N 13/15
                                                            600/407
2014/0120493 A1    5/2014   Levin
2014/0278279 A1*   9/2014   Azernikov ......... A61C 13/0003
                                                            703/1
2015/0206306 A1    7/2015   Adamson
2015/0320320 A1* 11/2015   Kopelman ............. A61B 6/032
                                                            433/215
2020/0311934 A1* 10/2020   Cherkas ................. G06T 19/00
2021/0059796 A1*   3/2021   Weiss ................... A61C 9/0053
2021/0085238 A1*   3/2021   Schnabel ............... A61C 7/002

(Continued)

FOREIGN PATENT DOCUMENTS

JP        2015-524724 A     8/2015
KR    10-2015-0082428 A     7/2015

(Continued)

OTHER PUBLICATIONS

Korean Office Action dated May 17, 2023 in Korean Application No. 10-2021-0121658.

*Primary Examiner* — William D Titcomb

(74) *Attorney, Agent, or Firm* — Sughrue Mion, PLLC

(57) ABSTRACT

An electronic device of the present disclosure is configured to acquire first scan data by a first scan performed by a three-dimensional scanner to scan an oral cavity of a subject, acquire second scan data by a second scan performed by the three-dimensional scanner to scan an impression model modeled on the oral cavity of the subject, invert one of the first scan data and the second scan data, determine whether an overlapping area exists between inverted scan data and non-inverted scan data, among the first scan data and the second scan data, and generate, if the overlapping area exists, a three-dimensional image model for the oral cavity of the subject by aligning the inverted scan data and the non-inverted scan data based on the overlapping area.

20 Claims, 19 Drawing Sheets

(56) References Cited

U.S. PATENT DOCUMENTS

2021/0378800 A1   12/2021   Lee et al.
2022/0327795 A1   10/2022   Song

FOREIGN PATENT DOCUMENTS

| KR | 10-2019-0063718 A | 6/2019 |
|---|---|---|
| KR | 10-2020-0101304 A | 8/2020 |
| KR | 10-2021-0082882 A | 7/2021 |

\* cited by examiner

1400

1401   1403

ELECTRONIC DEVICE AND METHOD FOR PROCESSING SCANNED IMAGE OF THREE DIMENSIONAL SCANNER

CROSS-REFERENCE TO RELATED APPLICATION

This application is based upon and claims the benefit of priority from Korean Patent Application No. 10-2021-0121658, filed on Sep. 13, 2021, the entire contents of which are incorporated herein by reference.

TECHNICAL FIELD

The present disclosure relates to an electronic device and a method for processing scanned images by a three-dimensional scanner. More particularly, the present disclosure relates to an electronic device for scanning an oral cavity of a subject and an impression model modeled on the oral cavity of the subject by using a three-dimensional scanner, thereby generating a three-dimensional image model for the oral cavity of the subject, and a method therefor.

BACKGROUND

A three-dimensional scanner is an optical device inserted into the oral cavity of a patient so as to scan teeth, thereby acquiring three-dimensional images of the oral cavity. By scanning the oral cavity of the patient with the three-dimensional scanner, a plurality of two-dimensional images for the oral cavity of the patient may be acquired, and a three-dimensional image for the oral cavity of the patient may be constructed by using the acquired plurality of two-dimensional images. For example, a doctor may insert the three-dimensional scanner into the oral cavity of the patient so as to scan the patient's teeth, gum, and/or soft tissues, thereby acquiring multiple two-dimensional images for the oral cavity of the patient. Thereafter, a three-dimensional modeling technology may be applied to construct a three-dimensional image for the oral cavity of the patient by using the two-dimensional images for the oral cavity of the patient.

SUMMARY

When a three-dimensional scanner is used to scan the oral cavity of a subject, a specific part of the oral cavity of the subject (for example, a bore part of a root canal in which a post & a core are to be installed, or a part of a margin line of a prep tooth, which is covered by gum) may be difficult to scan.

When the oral cavity of a subject is scanned by a three-dimensional scanner, scan data for a specific part (oral cavity scan data) may fail to be acquired. In such a case, an impression model modeled on the oral cavity of the subject may be scanned, thereby acquiring scan data for the specific part (impression scan data). In order to align the oral scan data and the impression scan data, the impression scan data may be acquired so as to include a part overlapping the oral scan data.

An electronic device according to various embodiments disclosed herein may include: a communication circuit configured to be communicatively connected to a three-dimensional scanner; at least one memory; and at least one processor. The at least one processor according to various embodiments may be configured to acquire first scan data by a first scan performed by the three-dimensional scanner to scan an oral cavity of a subject, acquire second scan data by a second scan performed by the three-dimensional scanner to scan an impression model modeled on the oral cavity of the subject, invert one of the first scan data and the second scan data, determine whether an overlapping area exists between inverted scan data and non-inverted scan data, among the first scan data and the second scan data, and generate, if the overlapping area exists, a three-dimensional image model for the oral cavity of the subject by aligning the inverted scan data and the non-inverted scan data based on the overlapping area.

A method for processing a scan image by an electronic device according to various embodiments disclosed herein may include: acquiring first scan data by a first scan performed by a three-dimensional scanner to scan an oral cavity of a subject; acquiring second scan data by a second scan performed by the three-dimensional scanner to scan an impression model modeled on the oral cavity of the subject; inverting one of the first scan data and the second scan data; determining whether an overlapping area exists between inverted scan data and non-inverted scan data, among the first scan data and the second scan data; and generating, if the overlapping area exists, a three-dimensional image model for the oral cavity of the subject by aligning the inverted scan data and the non-inverted scan data, based on the overlapping area.

BRIEF DESCRIPTION OF DRAWINGS

The accompanying drawings, which are incorporated in and constitute a part of the specification, illustrate embodiments of the present disclosure.

DETAILED DESCRIPTION

Figure 1:
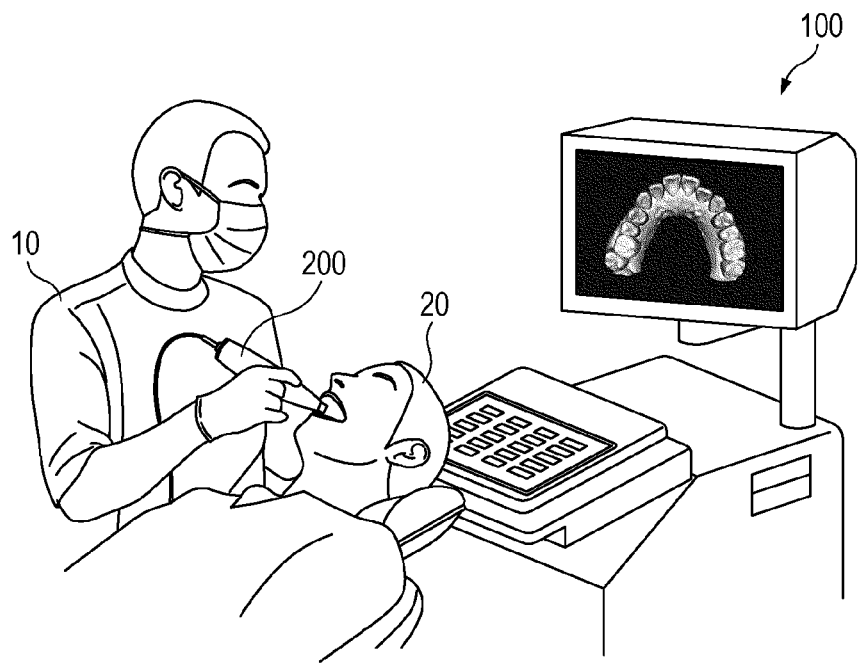
FIG. 1 illustrates a process of acquiring an image for an oral cavity of a patient through an intraoral scanner according to various embodiments of the present disclosure.

Embodiments of the present disclosure are examples given to describe the technical idea of the present disclosure. The scope of claims in accordance with the present disclosure is not limited by the embodiments presented below or detailed descriptions regarding the embodiments.

All technical or scientific terms used herein have meanings that are generally understood by a person having ordinary knowledge in the art to which the present disclosure pertains, unless otherwise specified. The terms used herein are selected for more clear illustration of the present disclosure, and are not intended to limit the scope of claims in accordance with the present disclosure.

The expressions "include," "provided with," "have" and the like used herein should be understood as open-ended terms connoting the possibility of inclusion of other embodiments, unless otherwise mentioned in a phrase or sentence including the expressions.

A singular expression can include meanings of plurality, unless otherwise mentioned, and the same is applied to a singular expression stated in the claims. The terms "first," "second," etc. used herein are used to identify a plurality of components from one another, and are not intended to limit the order or importance of the relevant components.

The term "unit" used in these embodiments means a software component or hardware component, such as a field-programmable gate array (FPGA) and an application specific integrated circuit (ASIC). However, a "unit" is not limited to software and hardware and it may be configured to be an addressable storage medium or may be configured to run on one or more processors. For example, a "unit" may include components, such as software components, object-oriented software components, class components, and task components, as well as processors, functions, attributes, procedures, subroutines, segments of program codes, drivers, firmware, micro-codes, circuits, data, databases, data structures, tables, arrays, and variables. Functions provided in components and "unit" may be combined into a smaller number of components and "units" or further subdivided into additional components and "units."

The expression "based on" used herein is used to describe one or more factors that influence a decision, an action of judgment or an operation described in a phrase or sentence including the relevant expression, and this expression does not exclude an additional factor influencing the decision, the action of judgment or the operation.

When a certain component is described as "coupled to" or "connected to" another component, this should be understood as meaning that the certain component may be coupled or connected directly to the other component or that the certain component may be coupled or connected to the other component via a new intervening component.

Hereinafter, embodiments of the present disclosure will be described with reference to the accompanying drawings. In the accompanying drawings, like or relevant components are indicated by like reference numerals. In the following description of embodiments, repeated descriptions of the identical or relevant components will be omitted. However, even if a description of a component is omitted, such a component is not intended to be excluded in an embodiment.

FIG. 1 illustrates a process of acquiring an image for the oral cavity of a patient through a three-dimensional scanner 200 according to various embodiments of the present disclosure. According to various embodiments of the present disclosure, the three-dimensional scanner 200 may be a dental medical device for acquiring intraoral images of a subject 20. For example, the three-dimensional scanner 200 may be an intraoral scanner. As illustrated in FIG. 1, a user 10 (for example, dentist or dental hygienist) may use the three-dimensional scanner 200 to acquire, from the subject 20 (for example, patient), images for the oral cavity of the subject 20. As another example, the user 10 may acquire images for the oral cavity of the subject 20 from an embossed diagnostic model (for example, plaster model) modeled on the oral cavity of the subject 20. It will be assumed hereinafter, for convenience of description, that the oral cavity of the subject 20 is scanned to acquire images for the oral cavity of the subject 20, but this assumption is not limiting in any manner, and images for other parts of the subject 20 (for example, ears of the subject 20) can also be acquired. The three-dimensional scanner 200 may be a handheld scanner which is shaped such that the same can move into and out of the oral cavity, and which is configured such that the scan distance and the scan angle can be freely adjusted by the user 10.

A three-dimensional scanner 200 according to various embodiments may be inserted into the oral cavity of the subject 20 so as to scan an interior of the oral cavity in a non-contact type, and may acquire images for the oral cavity. The images for the oral cavity may include at least one selected from the group of tooth, gum, and an artificial structure which can be inserted into the oral cavity (for example, an orthodontic device including a bracket and a wire, an implant, a denture, or an auxiliary orthodontic tool inserted into the oral cavity). The three-dimensional scanner 200 may use a light source (or projector) so as to emit light to the oral cavity of the subject 20 (for example, at least one tooth or gum of the subject 20), and may receive light reflected from the oral cavity of the subject 20 through a camera (or at least one image sensor). According to another embodiment, the three-dimensional scanner 200 may acquire images for a diagnostic model of the oral cavity by scanning the diagnostic model of the oral cavity. If the diagnostic model of the oral cavity is a diagnostic model embossed with the shape of the oral cavity of the subject 20, images for the diagnostic model of the oral cavity may be images for the oral cavity of the subject. It will be assumed hereinafter, for convenience of description, that images for the oral cavity are acquired by scanning the interior of the oral cavity of the subject 20, but this assumption is not limiting in any manner.

The three-dimensional scanner 200 according to various embodiments may acquire a surface image for the oral cavity of the subject 20 as a two-dimensional image, based on information received through a camera. The surface image for the oral cavity of the subject 20 may include at least one selected from the group of at least one tooth, gum, an artificial structure, cheeks, tongue, or lips of the subject 20. The surface image for the oral cavity of the subject 20 may be a two-dimensional image.

The two-dimensional image for the oral cavity acquired by the three-dimensional scanner 200 according to various embodiments may be transmitted to an electronic device 100 connected through a wired or wireless communication network. The electronic device 100 may be a computer or a portable communication device. The electronic device 100 may construct a three-dimensional image (or three-dimensional oral image, three-dimensional oral model) for the oral cavity, which is a three-dimensional representation of the oral cavity, based on the two-dimensional images for the oral cavity received from the three-dimensional scanner 200. The electronic device 100 may three-dimensionally model the internal structure of the oral cavity, based on the received two-dimensional image for the oral cavity, thereby generating a three-dimensional image for the oral cavity.

The three-dimensional scanner 200 according to another embodiment may acquire a two-dimensional image for the oral cavity by scanning the oral cavity of the subject 20, may generate a three-dimensional image for the oral cavity based on the acquired two-dimensional image for the oral cavity, and may transmit the generated three-dimensional image for the oral cavity to an electronic device 100.

The electronic device 100 according to various embodiments may be connected to a cloud server (not illustrated). In the above-mentioned case, the electronic device 100 may transmit the two-dimensional image for the oral cavity of the subject 20 or the three-dimensional image for the oral cavity to the cloud server, and the cloud server may store the two-dimensional image for the oral cavity of the subject 20 or the three-dimensional image for the oral cavity received from the electronic device 100.

According to another embodiment, in addition to the handheld scanner inserted into the oral cavity of the subject 20 and used, a table scanner (not illustrated) used by being fixed in a specific position may be used as the three-dimensional scanner. The table scanner may generate a three-dimensional image for the diagnostic model of the oral cavity by scanning a diagnostic model of the oral cavity. In the above-mentioned case, the light source (or projector) and the camera of the table scanner are fixed, and the user may scan the diagnostic model of the oral cavity while moving the diagnostic model of the oral cavity.

Figure 2A:
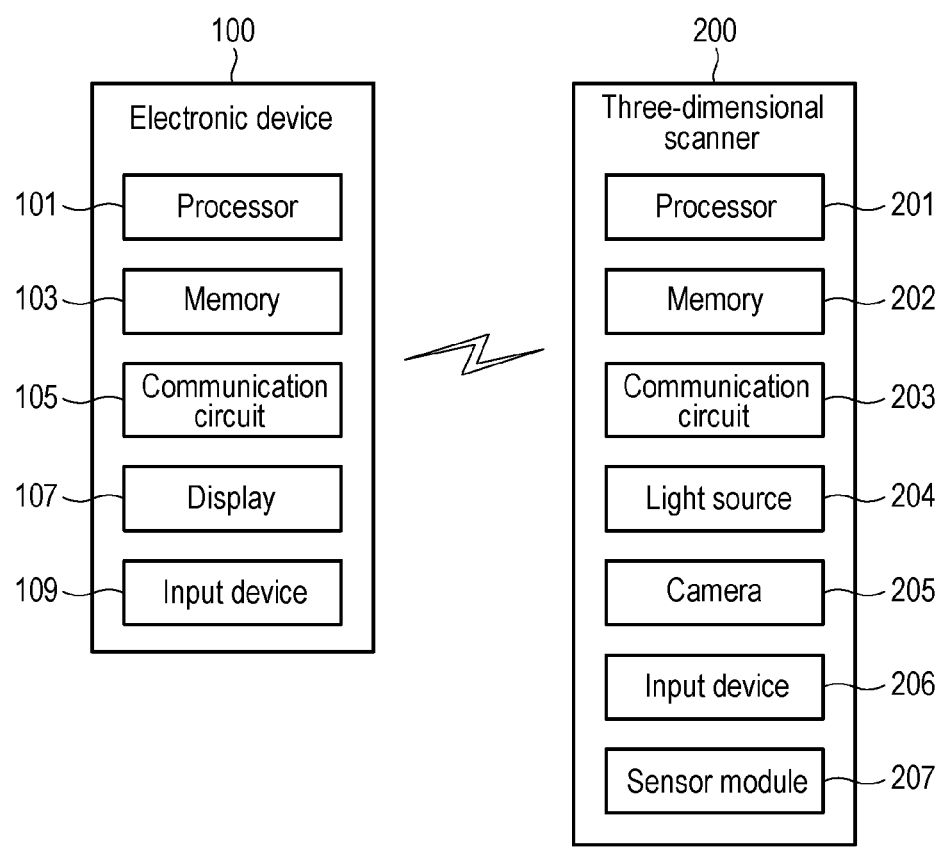
FIG. 2A is a block diagram of an electronic device and an intraoral scanner according to various embodiments of the present disclosure.

FIG. 2A is a block diagram of an electronic device 100 and a three-dimensional scanner 200 according to various embodiments of the present disclosure. The electronic device 100 and the three-dimensional scanner 200 may have communication connection with each other through a wired or wireless communication network, and may transmit/receive various pieces of data with each other.

The three-dimensional scanner 200 according to various embodiments may include a processor 201, a memory 202, a communication circuit 203, a light source 204, a camera 205, an input device 206, and/or a sensor module 207. At least one of the elements included in the three-dimensional scanner 200 may be omitted, or another element may be added to the three-dimensional scanner 200. Additionally or alternatively, some elements may be implemented in an integrated manner, or implemented as a single entity or multiple entities. At least some elements inside the three-dimensional scanner 200 may be interconnected through a bus, a general purpose input/output (GPIO), a serial peripheral interface (SPI), a mobile industry processor interface (MIPI), or the like, thereby exchanging data and/or signals.

The processor 201 of the three-dimensional scanner 200 according to various embodiments is configured to be able to perform operations or data processing related to control and/or communication of respective elements of the three-dimensional scanner 200, and may be operatively connected to elements of the three-dimensional scanner 200. The processor 201 may load commands or data received from another element of the three-dimensional scanner 200 into the memory 202, may process commands or data stored in the memory 202, and may store resulting data in the memory 202. The memory 202 of the three-dimensional scanner 200 according to various embodiments may store instructions regarding operations of the processor 201 described above.

According to various embodiments, the communication circuit 203 of the three-dimensional scanner 200 may establish a wired or wireless communication channel with an external device (for example, electronic device 100) and may transmit/receive various pieces of data with the external device. According to an embodiment, the communication circuit 203 may include at least one port to connect to the external device through a wired cable, in order to communicate with the external device in a wired manner. In the above-mentioned case, the communication circuit 203 may communicate with the external device connected in a wired manner through the at least one port. According to an embodiment, the communication circuit 203 may include a cellular communication module and may be configured to connect to a cellular network (for example, 3G, LTE, 5G, Wibro, or Wimax). According to various embodiments, the communication circuit 203 may include a short-range communication module and may transmit/receive data with an external device by using short-range communication (for example, Wi-Fi, Bluetooth, Bluetooth Low Energy (BLE), or UWB), but is not limited thereto. According to an embodiment, the communication circuit 203 may include a non-contact communication module for non-contact communication. The non-contact communication may include at least one non-contact-type near-field communication technology such as near field communication (NFC), radio frequency identification (RFID) communication, or magnetic secure transmission (MST), for example.

According to various embodiments, the light source 204 of the three-dimensional scanner 200 may emit light toward the oral cavity of the subject 20. For example, light emitted from the light source 204 may be structured light having a predetermined pattern (for example, a stripe pattern having straight patterns with different colors appearing continuously). The pattern of the structured light may be generated by using a pattern mask or a digital micro-mirror device (DMD), for example, but is not limited thereto. According to various embodiments, the camera 205 of the three-dimensional scanner 200 may acquire images for the oral cavity of the subject 20 by receiving reflected light, which is reflected by the oral cavity of the subject 20. For example, the camera 205 may include a left camera corresponding to a field of view of a left eye and a right camera corresponding to a field of view of a right eye, in order to construct a three-dimensional image according to optical triangulation. The camera 205 may include at least one image sensor such as a CCD sensor or a CMOS sensor.

According to various embodiments, the input device 206 of the three-dimensional scanner 200 may receive a user input for controlling the three-dimensional scanner 200. The input device 206 may include buttons for receiving a push manipulation from the user 10, a touch panel for sensing a touch made by the user 10, and a speech recognition device including a microphone. For example, the user 10 may control scanning so as to start or end through the input device 206.

According to various embodiments, the sensor module 207 of the three-dimensional scanner 200 may sense the operating state of the three-dimensional scanner 200 or the external environment state (for example, user's motion) and may generate an electric signal corresponding to the sensed state. For example, the sensor module 207 may include at least one selected from the group of a gyro sensor, an acceleration sensor, a gesture sensor, a proximity sensor, or an infrared sensor. The user 10 may control scanning so as to start or end by using the sensor module 207. For example, if the user 10 holds and moves the three-dimensional scanner 200 by hand, the three-dimensional scanner 200 may control the processor 201 so as to start a scanning operation when the angular velocity measured through the sensor module 207 exceeds a preconfigured threshold value.

According to an embodiment, the three-dimensional scanner 200 may receive a user input for starting scanning through the input device 206 of the three-dimensional scanner 200 or the input device 109 of the electronic device 100, or may start scanning according to processing executed by the processor 201 of the three-dimensional scanner 200 or the processor 101 of the electronic device 100. When the user 10 scans the interior of the oral cavity of the subject 20 through the three-dimensional scanner 200, the three-dimensional scanner 200 may generate a two-dimensional image for the oral cavity of the subject 20, and may transmit the two-dimensional image for the oral cavity of the subject 20 to the electronic device 100 in real time. The electronic device 100 may display the received two-dimensional image for the oral cavity of the subject 20 by using a display. In addition, the electronic device 100 may generate (construct) a three-dimensional image for the oral cavity of the subject 20, based on the two-dimensional image for the oral cavity of the subject 20, and may display the three-dimensional image for the oral cavity by using the display. The electronic device 100 may also display a currently generated three-dimensional image by using the display in real time.

According to various embodiments, the electronic device 100 may include one or more processor 101, one or more memory 103, a communication circuit 105, a display 107, and/or an input device 109. At least one of the elements included in the electronic device 100 may be omitted, or another element may be added to the electronic device 100. Additionally or alternatively, some elements may be implemented in an integrated manner, or implemented as a single entity or multiple entities. At least some elements inside the electronic device 100 may be interconnected through a bus, a general purpose input/output (GPIO), a serial peripheral interface (SPI), a mobile industry processor interface (MIPI), or the like, thereby exchanging data and/or signals.

According to various embodiments, one or more processor 101 of the electronic device 100 may be configured to perform operations or data processing related to control and/or communication of respective elements (for example, the memory 103) of the electronic device 100. The one or more processor 101 may be operatively connected to elements of the electronic device 100, for example. The one or more processor 101 may load commands or data received from another element of the electronic device 100 into the one or more memory 103, may process commands or data stored in the one or more memory 103, and may store resulting data.

According to various embodiments, the one or more memory 103 of the electronic device 100 may store instructions regarding operations of the one or more processor 101. The one or more memory 103 may store correlation models constructed according to a machine learning algorithm. The one or more memory 103 may store data (for example, a two-dimensional image for the oral cavity acquired through intraoral scan) received from the three-dimensional scanner 200.

According to various embodiments, the communication circuit 105 of the electronic device 100 may establish a wired or wireless communication channel with an external device (for example, the three-dimensional scanner 200, or the cloud server) and may transmit/receive various pieces of data with the external device. According to an embodiment, the communication circuit 105 may include at least one port to connect to the external device through a wired cable, in order to communicate with the external device in a wired manner. In the above-mentioned case, the communication circuit 105 may communicate with the external device connected in a wired manner through the at least one port. According to an embodiment, the communication circuit 105 may include a cellular communication module and may be configured to connect to a cellular network (for example, 3G, LTE, 5G, Wibro, or Wimax). According to various embodiments, the communication circuit 105 may include a short-range communication module and may transmit/receive data with an external device by using short-range communication (for example, Wi-Fi, Bluetooth, Bluetooth Low Energy (BLE), or UWB), but is not limited thereto. According to an embodiment, the communication circuit 105 may include a non-contact communication module for non-contact communication. The non-contact communication may include at least one non-contact-type near-field communication technology such as near field communication (NFC), radio frequency identification (RFID) communication, or magnetic secure transmission (MST), for example.

According to various embodiments, the display 107 of the electronic device 100 may display various screens based on control of the processor 101. The processor 101 may display a two-dimensional image for the oral cavity of the subject 20 received from the three-dimensional scanner 200 and/or a three-dimensional image for the oral cavity obtained by three-dimensionally modeling the internal structure of the oral cavity, through the display 107. For example, a two-dimensional image for the oral cavity and/or a three-dimensional image may be displayed through a specific application program. In the above-mentioned case, the user 10 may edit, store, and delete the two-dimensional image for the oral cavity and/or the three-dimensional image.

According to various embodiments, the input device 109 of the electronic device 100 may receive a command or data to be used for an element (for example, one or more processor 101) of the electronic device 100 from the outside (for example, user) of the electronic device 100. The input device 109 may include a microphone, a mouse, or a keyboard, for example. According to an embodiment, the input device 109 may be combined with the display 107 and implemented as a touch sensor panel capable of recognizing contacts or approaches of various external entities.

Figure 2B:
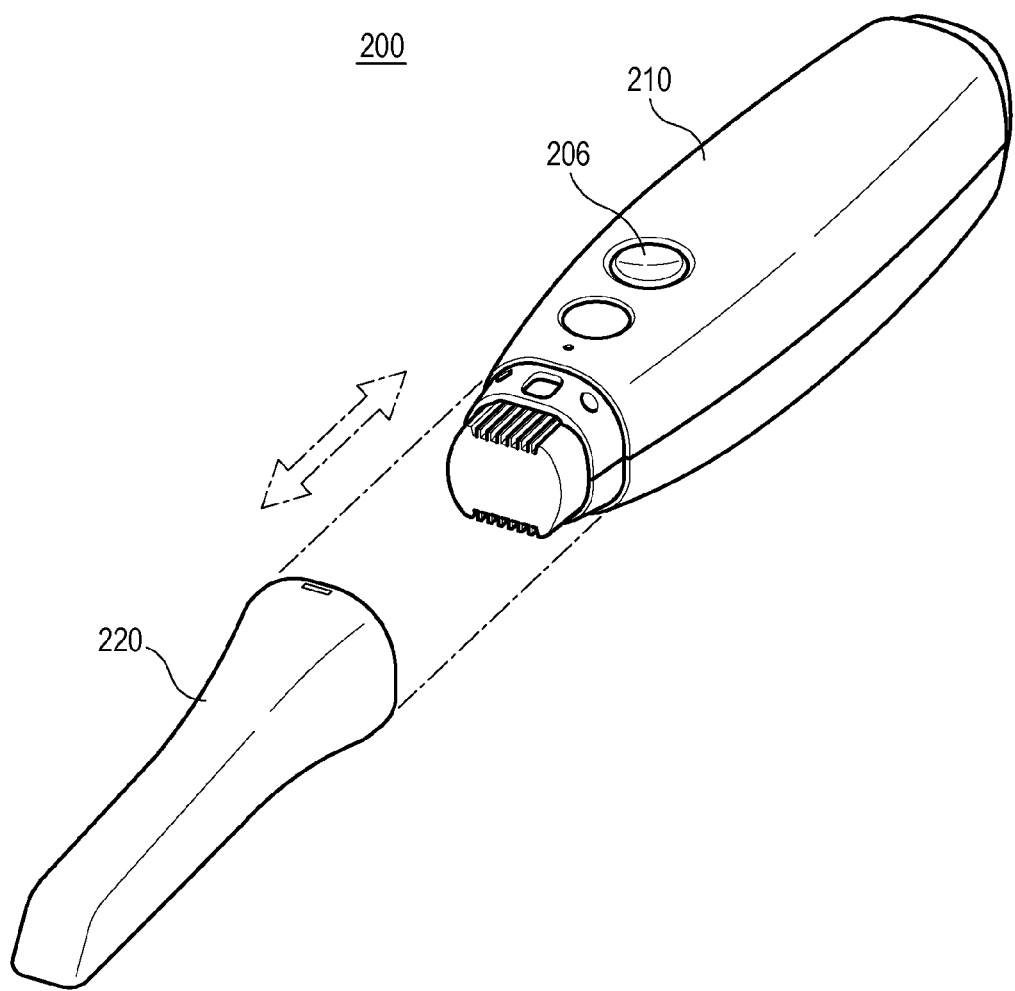
FIG. 2B is a perspective view of an intraoral scanner according to various embodiments of the present disclosure.

FIG. 2B is a perspective view of a three-dimensional scanner 200 according to various embodiments. According to various embodiments, the three-dimensional scanner 200 may include a body 210 and a probe tip 220. The body 210 of the three-dimensional scanner 200 may be shaped such that the user 10 can easily grip and use the same by hand. The probe tip 220 may be shaped such that the same can be easily moved into and out of the oral cavity of the subject 20.

In addition, the body 210 may be coupled to and separated from the probe tip 220. The elements of the three-dimensional scanner 200 described with reference to FIG. 2A may be disposed in the body 210. The body 210 may have an opening formed in one end thereof such that light output from the light source 204 can be emitted to the subject 20. The light emitted through the opening may be reflected by the subject 20 and again introduced through the opening. The reflected light introduced through the opening may be captured by the camera 20 and used to generate an image for the subject 20. The user 10 may start scanning through the input device 206 (for example, button) of the three-dimensional scanner 200. For example, if the user 10 touches or presses the input device 206, light may be emitted from the light source 204 to the subject 20.

Figure 3:
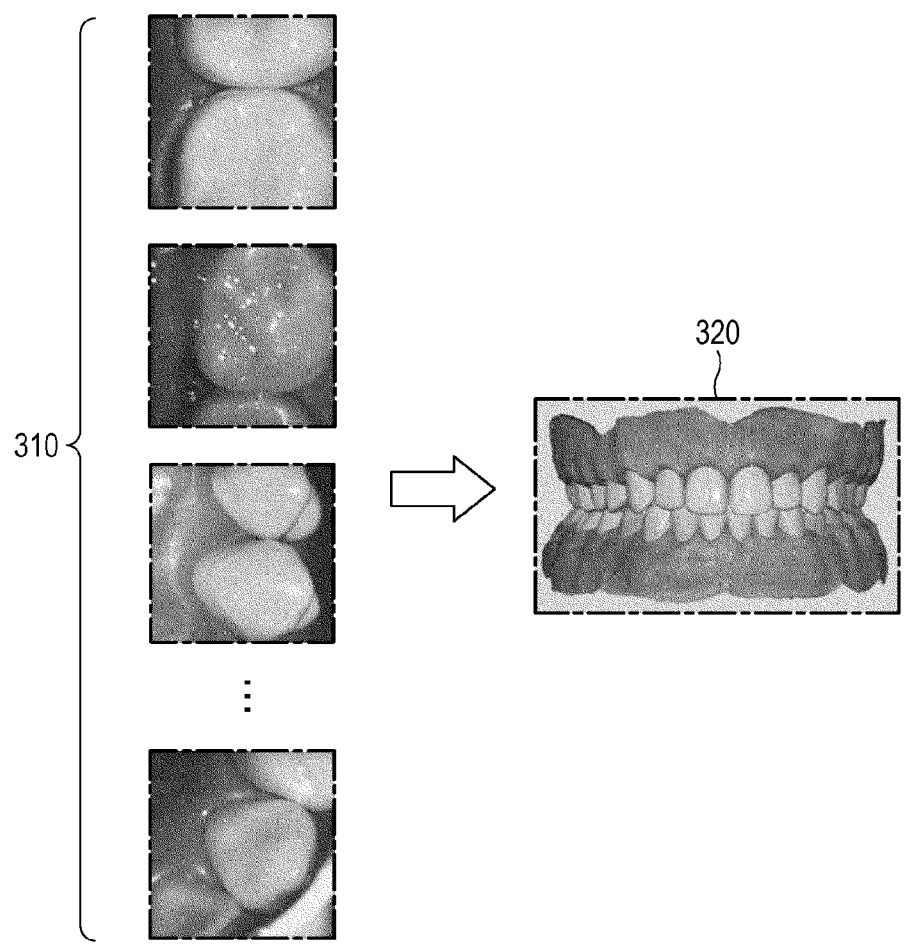
FIG. 3 illustrates a method for generating a three-dimensional image for an oral cavity according to various embodiments.

FIG. 3 illustrates a method for generating a three-dimensional image 320 for an oral cavity according to various embodiments. A user 10 may scan the interior of the oral cavity of the subject 20 while moving the three-dimensional scanner 200. In this case, the three-dimensional scanner 200 may acquire multiple two-dimensional images 310 for the oral cavity of the subject 20. For example, the three-dimensional scanner 200 may acquire a two-dimensional image for an area including front teeth of the subject 20, a two-dimensional image for an area including molars of the subject 20, and the like. The three-dimensional scanner 200 may transmit the acquired two-dimensional images 310 to the electronic device 100. According to another embodiment, the user 10 may scan a diagnostic model of the oral cavity while moving the three-dimensional scanner 200, and may acquire multiple two-dimensional images for the diagnostic model of the oral cavity. It will be assumed hereinafter, for convenience of description, that the interior of the oral cavity of the subject 20 is scanned, thereby acquiring images for the oral cavity of the subject 20, but this assumption is not limiting in any manner.

According to various embodiments, the electronic device 100 may convert each of the plurality of two-dimensional images 310 for the oral cavity of the subject 20 to a set of multiple points having a three-dimensional coordinate value. For example, the electronic device 100 may convert each of the plurality of two-dimensional images 310 to a point cloud, which is a set of data points having a three-dimensional coordinate value. For example, a point cloud set, which is a three-dimensional coordinate value based on the plurality of two-dimensional images 310, may be stored as raw data for the oral cavity of the subject 20. The electronic device 100 may align the point cloud, which is a set of data points having a three-dimensional coordinate value, thereby completing the overall tooth model.

According to various embodiments, the electronic device 100 may reconfigure (reconstruct) a three-dimensional image for the oral cavity. For example, the electronic device 100 may reconfigure multiple points by using Poisson algorithm so as to merge the point cloud set stored as raw data, and may reconfigure the three-dimensional image 320 for the oral cavity of the subject 20 by converting the same to a closed three-dimensional surface.

Figure 4:
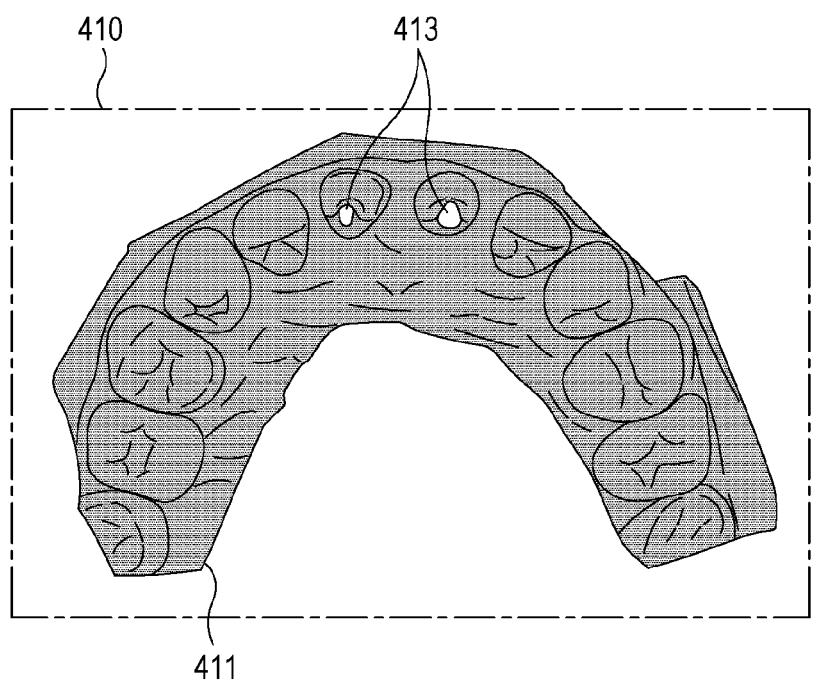
FIG. 4 illustrates first scan data acquired by a first scan performed by a three-dimensional scanner for scanning the oral cavity of a subject according to various embodiments of the present disclosure.

FIG. 4 illustrates first scan data 410 acquired by a first scan performed by the three-dimensional scanner 200 for scanning the oral cavity of a subject according to various embodiments of the present disclosure. A user may scan the oral cavity of the subject by using the three-dimensional scanner 200. In the above-mentioned case, the electronic device 100 may acquire first scan data 410 obtained by scanning the oral cavity of the subject through the three-dimensional scanner 200. The acquired first scan data 410 may be an embossed image having the same shape as the oral cavity of the subject.

The first scan data 410 may include scan data 411 for most tooth areas and gum areas among the oral cavity of the subject and may not include scan data 413 for a specific part which is difficult to scan. For example, if a tooth of the subject has a bore part of a root canal in which a post & a core are to be installed, the bore part is difficult to scan, and scan data for the bore part may fail to be acquired. For example, if there is a part of a margin line of a prep tooth, which is covered by gum, scan data for that part may fail to be acquired. For example, in the case of scanning a diagnostic model (for example, plaster model) which replicates the oral cavity of the subject, scan data for a part removed by trimming the diagnostic model may fail to be acquired. The above-mentioned cases are exemplary, and scan data 413 for a specific part of the oral cavity of the subject may fail to be acquired for various other reasons. Accordingly, a partially empty area may exist in the first scan data 410 obtained by scanning the oral cavity of the subject.

Referring to FIG. 4, the first scan data 410 acquired by scanning the oral cavity of the subject may include scan data 411 for most tooth areas and gum areas, and may not include scan data 413 for a specific part, which may be displayed as an empty area in the first scan data 410.

Figure 5A:
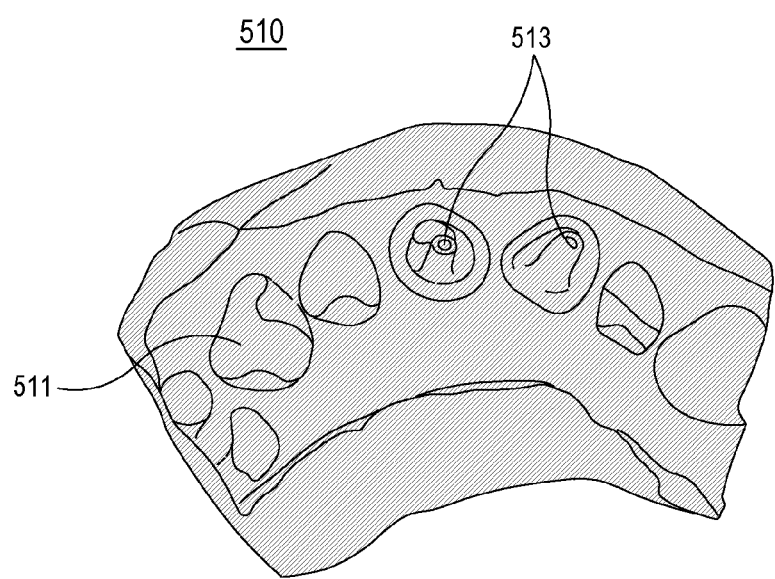
FIG. 5A and FIG. 5B illustrate an impression model modeled on the oral cavity of a subject according to various embodiments of the present disclosure and second scan data obtained by scanning the impression model.
Figure 5B:
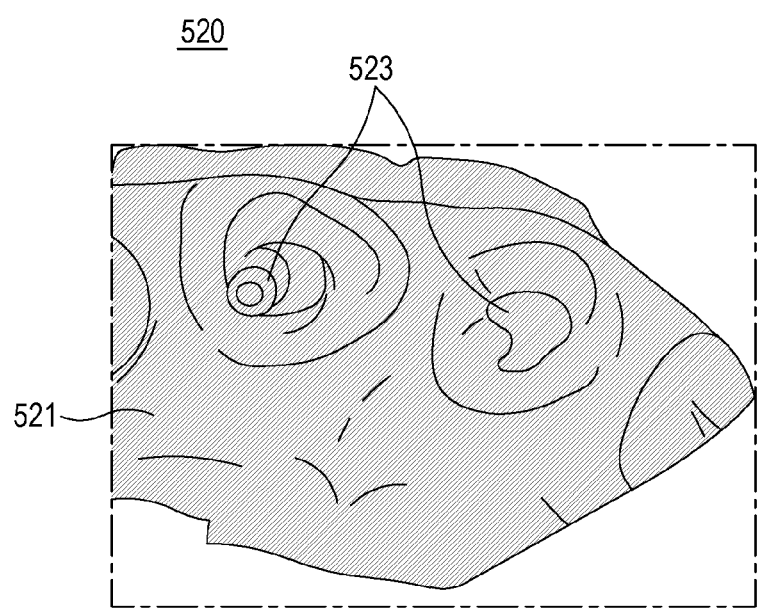

FIG. 5A and FIG. 5B illustrate an impression model 510 modeled on the oral cavity of the subject and second scan data 520 obtained by scanning the impression model 510 according to various embodiments of the present disclosure.

According to various embodiments, a user may generate an impression model 510 modeled on the oral cavity of the subject. In order to generate an impression model 510, an irreversible elastic impression material (for example, alginate) may be used. For example, a sol-state impression material may be poured into a tray and modeled on the oral cavity of the subject. The impression model modeled on the oral cavity hardens and reaches a gel state in a predetermined time, which may be referred to as an impression model 510. The impression model 510 may be an engraved model of the oral cavity of the subject. As in FIG. 5A, protruding parts in tooth areas and gum areas of the subject may have recessed shapes 511 in the impression model, and recessed parts (for example, a bore part of a root canal) of the subject may have protruding shapes 513 in the impression model.

Referring to FIG. 5B, the electronic device 100 may acquire second scan data 520 by a second scan performed by the three-dimensional scanner 200 to scan the impression model 510. The user may scan the impression model 510 with the three-dimensional scanner 200 to supplement empty areas in the first scan data 410. The second scan data 520 may include scan data 523 for a specific part not included in the first scan data 410, and may include scan data 521 for tooth areas and gum areas included in the first scan data. The acquired second scan data 520 may be an engraved image as in the case of the impression model.

Figure 6:
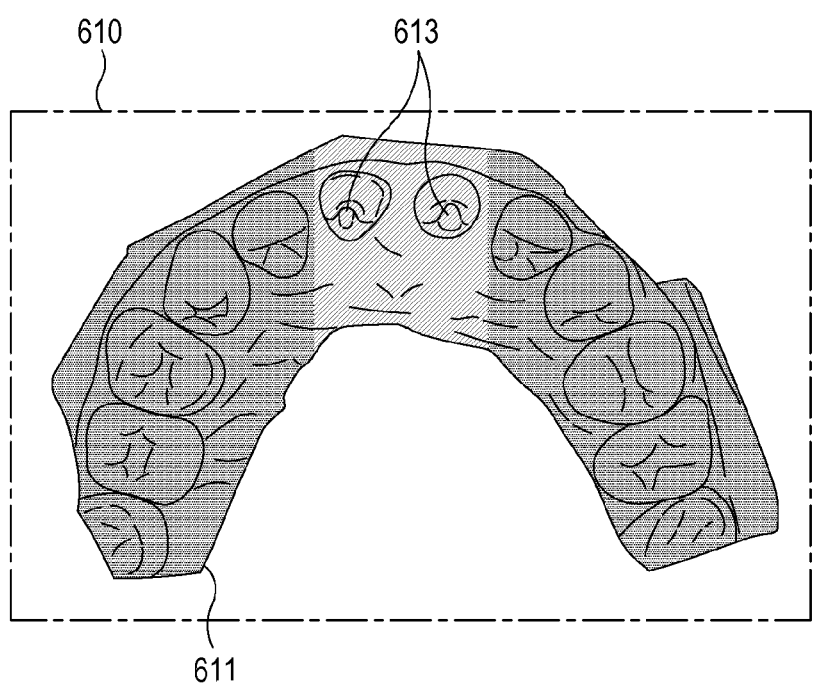
FIG. 6 illustrates a three-dimensional image model for the oral cavity of a subject according to various embodiments of the present disclosure.

FIG. 6 illustrates a three-dimensional image model 610 for the oral cavity of a subject according to various embodiments of the present disclosure.

Referring to FIG. 6, an electronic device 100 according to various embodiments may invert one of first scan data 410 and second scan data 520 and may generate a three-dimensional image model 610 for the oral cavity of the subject by aligning the inverted scan data and non-inverted scan data, among the first scan data 410 and the second scan data 520. The image 613 for a specific part of the generated three-dimensional image model 610 has been generated based on the second scan data 520, and the image 611 for tooth areas and gum areas other than the above-mentioned specific part has been generated based on the first scan data 410. That is, the electronic device 100 may generate a three-dimensional image model 610 for the oral cavity of the subject by supplementing scan data 413 for the specific part missing in the first scan data 410 using the second scan data 520. The specific method for inverting one of the first scan data 410 and the second scan data 520 and coupling the same to each other will be described later.

According to various embodiments, the electronic device 100 may invert one of the first scan data 410 and the second scan data 520. According to an embodiment, the electronic device 100 may determine in real time whether an overlapping area exists between the inverted scan data and the non-inverted scan data, among the first scan data 410 and the second scan data 520, while performing the second scan. The electronic device 100 may repeatedly determine whether an overlapping area exists between the inverted scan data and the non-inverted scan data, among the first scan data 410 and the second scan data 520. According to another embodiment, the electronic device 100 may invert one of the first scan data 410 and the second scan data 520 after completing the first scan and the second scan.

According to various embodiments, based on an overlapping area between the inverted scan data and the non-inverted scan data among the first scan data 410 and the second scan data 520, the electronic device 100 may align the inverted scan data and the non-inverted scan data with each other. The electronic device 100, for example, may align the inverted scan data and the non-inverted scan data with each other, based on the overlapping area by using smart stitching. Smart stitching may refer to a method wherein, even if scan data is not, pieces of scan data acquired in different areas are aligned and connected. Specifically, smart stitching may refer to a method wherein pieces of scan data acquired in different areas are stored, it is determined whether an overlapping area exists between the pieces of scan data, and if an overlapping area exists, the pieces of scan data are aligned and connected based on the overlapping area. That is, when performing an alignment operation by using smart stitching, the electronic device 100 may acquire the first scan data 410 through a first scan and may then acquire the second scan data 520 through a second scan. Even if the second scan is not performed from an area overlapping the first scan data 410, the second scan data 520 may be separately stored and, during or after the scan, alignment may be performed.

According to various embodiments, if an overlapping area exists, the electronic device 100 may align the inverted scan data and the non-inverted scan data, based on the overlapping area. The electronic device 100 may generate a three-dimensional image model for the oral cavity of the subject through the alignment operation. If no overlapping area exists, the electronic device 100 may store the first scan data 410 and the second scan data 520. That is, the electronic device 100 may repeatedly determine whether an overlapping area exists between the inverted scan data and the non-inverted scan data while performing the second scan and, until an overlapping area is deemed to exist, may store the first scan data 410 and the second scan data 520, and may display the same through the display 107. After an overlapping area is deemed to exist, the electronic device 100 may align the inverted scan data and the non-inverted scan data based on the overlapping area and may display the generated three-dimensional image model through the display 107.

In order to align the above-mentioned pieces of scan data with each other, an additional step may be needed to determine the alignment surface. For example, the first scan data acquired by a first scan performed by a three-dimensional scanner 200 for scanning the oral cavity of a subject is scan data acquired by scanning the surface area of the oral cavity of the subject. That is, the first scan data is scan data corresponding to a surface (hereinafter, referred to as first surface) of the oral cavity of the subject including information such as color. The first scan data includes a plurality of three-dimensional coordinate values and is displayed as a three-dimensional image and, in order to implement the same as a three-dimensional image, the opposite surface (hereinafter, referred to as second surface) of the first surface (surface of oral cavity) may be configured together with the first surface. The second surface does not include information such as color, and has the opposite shape to the first surface. Therefore, when different pieces of scan data are aligned in general, each and every piece of scan data needs to be scan data corresponding to the first surface or scan data corresponding to the second surface. That is, in order to couple different pieces of scan data, an identical alignment surface needs to be configured.

The electronic device 100 may set the surface of the first scan data 410 obtained by scanning the oral cavity of the subject as a first surface, and may set the opposite surface of the first surface as a second surface. The electronic device 100 may determine whether second scan data 520 obtained by scanning an impression model corresponds to data obtained by scanning the first surface or scan data obtained by scanning the second surface. For example, based on information included in scan data, the electronic device 100 may determine whether second scan data 520 corresponds to data obtained by scanning the first surface or corresponds to scan data obtained by scanning the second surface. In response to determining that the second scan data 520 corresponds to data obtained by scanning the first surface, the electronic device 100 may align the second scan data 520 and the first surface of the first scan data 410 with each other. In response to determining that the second scan data 520 corresponds to data obtained by scanning the second surface, the electronic device 100 may align the second scan data 520 and the second surface of the first scan data 410 with each other.

Figure 7:
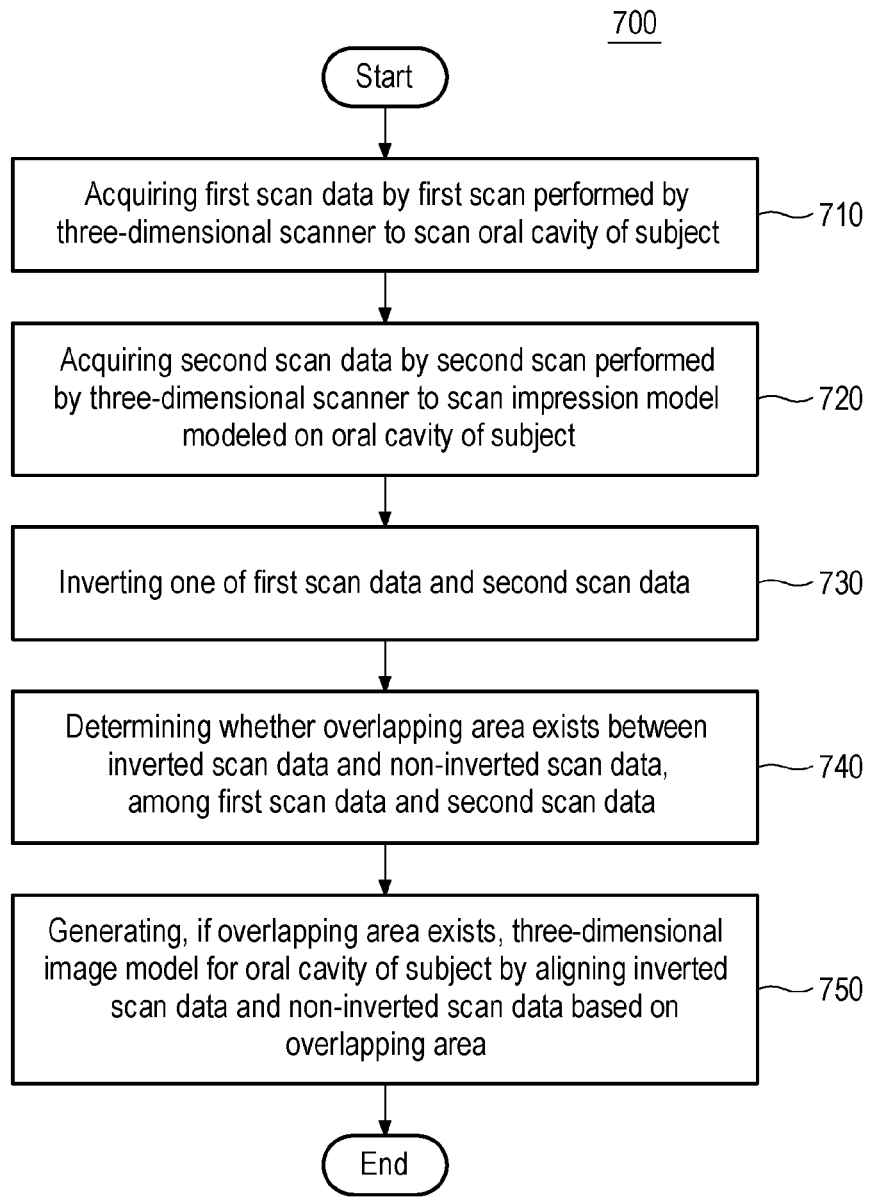
FIG. 7 is a flowchart illustrating operations of an electronic device according to various embodiments of the present disclosure.

FIG. 7 is a flowchart of operations of the electronic device 100 according to various embodiments of the present disclosure.

Referring to the operation flowchart 700, in operation 710, the electronic device 100 according to various embodiments may acquire first scan data by a first scan performed by a three-dimensional scanner 200 which scans the oral cavity of a subject. The first scan data includes a plurality of three-dimensional coordinate values, and may be displayed as a three-dimensional image.

According to various embodiments, in operation 720, the electronic device 100 may acquire second scan data by a second scan performed by the three-dimensional scanner 200 which scans an impression model modeled on the oral cavity of the subject. The second scan data includes a plurality of three-dimensional coordinate values, and may be displayed as a three-dimensional image. It has been assumed, for convenience of description with reference to FIG. 7, that the second scan data obtained by scanning the impression model is acquired later than the first scan data obtained by scanning the oral cavity of the subject, but various embodiments disclosed herein will be implemented with no difficulty even if the second scan data is acquired first.

According to various embodiments, in operation 730, the electronic device 100 may invert one of the first scan data and the second scan data. According to an embodiment, the electronic device 100 may invert one of the first scan data and the second scan data in real time while performing the second scan. According to another embodiment, the electronic device 100 may invert one of the first scan data and the second scan data after completing the first scan and the second scan.

According to various embodiments, in operation 740, the electronic device 100 may determine whether an overlapping area exists between the inverted scan data and non-inverted scan data, among the first scan data and the second scan data. According to an embodiment, the electronic device 100 may determine whether an overlapping area exists between the inverted scan data and non-inverted scan data after completing the first scan and the second scan. According to an embodiment, the electronic device 100 may determine in real time whether an overlapping area exists between the inverted scan data and non-inverted scan data while performing the second scan. For example, when the first scan data has been inverted, the electronic device 100 may determine whether an overlapping area exists between the inverted first scan data and the non-inverted second scan data. For example, when the second scan data has been inverted, the electronic device 100 may determine whether an overlapping area exists between the non-inverted first scan data and the inverted second scan data.

According to various embodiments, in operation 750, if an overlapping area exists between the inverted scan data and the non-inverted scan data, the electronic device 100 may generate a three-dimensional image model for the oral cavity of the subject by aligning the inverted scan data and the non-inverted scan data based on the overlapping area. The first scan data is an embossed image (for example, first scan data 410 in FIG. 4), and the second scan data is an engraved image (for example, second scan data 520 in FIG. 5B). Therefore, in order to couple the first scan data and the second scan data to each other, one of the first scan data and the second scan data needs to be inverted. For example, if the first scan data has been inverted, the inverted first scan data and the non-inverted second scan data may be coupled to each other by aligning the same. For example, if the second scan data has been inverted, the inverted second scan data and the non-inverted first scan data may be coupled to each other by aligning the same.

The electronic device 100 may repeatedly determine whether an overlapping area exists between the inverted scan data and the non-inverted scan data by using smart stitching. If an overlapping area exists between the inverted scan data and the non-inverted scan data, the electronic device 100 may align the inverted scan data and the non-inverted scan data. That is, when the user performs a second scan by using the three-dimensional scanner 200, the first scan data and the second scan data may be connected when an overlapping area is generated through a second scan, even if the scan is not performed from the area overlapping the first scan. The electronic device 100 may determine whether the above-mentioned overlapping area exists after completing the first scan and the second scan, or may determine in real time whether the above-mentioned overlapping area exists while performing the second scan.

According to various embodiments, the electronic device 100 may invert one of the first scan data and the second scan data by using a scheme in which a vertex normal thereof is inverted. By using this scheme, an embossed image may be inverted to an engraved image, and vice versa.

According to another embodiment, the electronic device 100 may invert one of the first scan data and the second scan data in response to receiving a user input for ending the second scan by the three-dimensional scanner 200 through the input device 109. For example, when the user has completed the second scan, a scan ending icon displayed within an interface for generating a three-dimensional image model of the subject may be selected through the input device 109. In this case, in response to receiving a user input made to select the scan ending icon in order to end the second scan, the electronic device 100 may invert one of the first scan data and the second scan data for aligning the first scan data and the second scan data with each other. The electronic device 100 may generate a three-dimensional image model for the oral cavity of the subject by aligning the inverted scan data and the non-inverted scan data among the first scan data and the second scan data.

According to various embodiments, the electronic device 100 may invert the first scan data in response to receiving a user input for starting a second scan by the three-dimensional scanner 200 through the input device 109. For example, the electronic device 100 may invert first scan data in response to receiving a user input for starting scan after the first scan data is acquired by the three-dimensional scanner 200, and may then acquire second scan data by a second scan. The electronic device 100 may determine whether an overlapping area exists between the inverted first scan data and the non-inverted second scan data and, in response to determining that an overlapping area exists, the electronic device 100 may align the inverted first scan data and the non-inverted second scan data. For example, the electronic device 100 may determine in real time whether an overlapping area exists between the inverted first scan data and the non-inverted second scan data while performing the second scan. The electronic device 100 may store the inverted first scan data and the non-inverted second scan data, until the alignment is performed, and may display the inverted first scan data and the non-inverted second scan data through the display 107. After performing the alignment, the electronic device 100 may generate a three-dimensional engraved image model for the oral cavity of the subject, and may display the generated three-dimensional engraved image model through the display 107. In this case, the electronic device 100 may generate a three-dimensional embossed image model for the oral cavity of the subject by inverting the three-dimensional engraved image model in response to receiving a user input for ending the second scan by the three-dimensional scanner 200 through the input device 109, and may display the generated three-dimensional embossed image model through the display 107.

Figure 8:
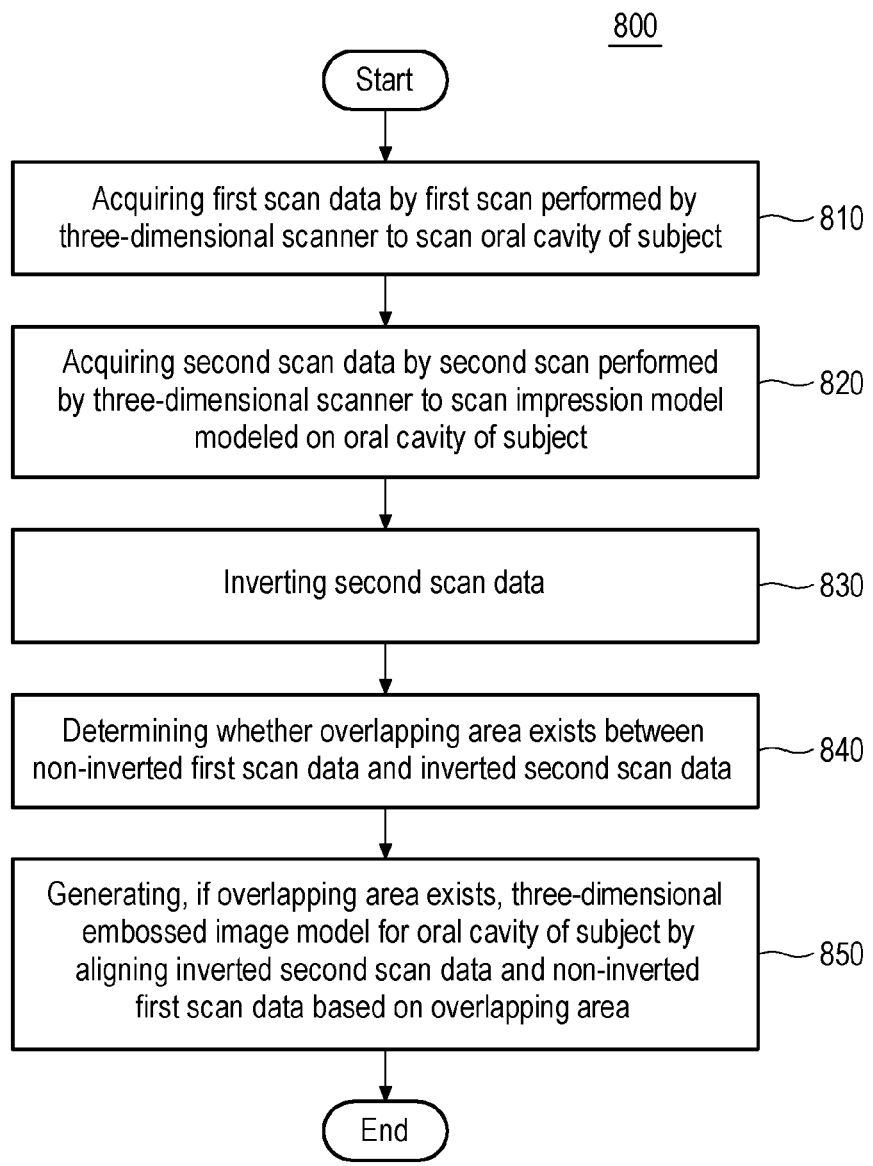
FIG. 8 is a flowchart illustrating operations of an electronic device when second scan data is inverted.

FIG. 8 to FIG. 11 illustrate a method for generating a three-dimensional image model in the case of inverting second scan data according to various embodiments of the present disclosure. Specifically, FIG. 8 is a flowchart of operations of the electronic device 100 in the case of inverting the second scan data. Descriptions identical to those made with reference to FIG. 7 will be omitted herein.

Referring to the operation flowchart 800, the electronic device 100 according to various embodiments may acquire first scan data by a first scan performed by the three-dimensional scanner 200 for scanning the oral cavity of a subject in operation 810.

According to various embodiments, in operation 820, the electronic device 100 may acquire second scan data by a second scan performed by the three-dimensional scanner 200 to scan an impression model modeled on the oral cavity of the subject.

According to various embodiments, in operation 830, the electronic device 100 may invert the second scan data. For example, the electronic device 100 may invert the second scan data acquired after the first scan and the second scan are completed. For example, the electronic device 100 may invert acquired second scan data in real time while performing the second scan. The electronic device 100 may invert the engraved second scan data obtained by scanning an impression model among the first scan data and the second scan data. The inverted second scan data may be embossed scan data. According to an embodiment, the electronic device 100 may identify second scan data obtained by scanning an impression model according to a user input. According to an embodiment, the electronic device 100 may identify second scan data which is scan data for an impression model, based on information about the first scan data and the second scan data. The information about the first scan data and the second scan data may include at least one selected from the group of color, shape, and texture. For example, the electronic device 100 may identify the second scan data which is scan data for an impression model based on the color of the first scan data and the second scan data. According to an embodiment, the electronic device 100 may invert one of the first scan data and the second scan data, based on the result of identification.

According to various embodiments, in operation 840, the electronic device 100 may determine whether an overlapping area exists between the non-inverted first scan data and the inverted second scan data. For example, the electronic device 100 may determine whether an overlapping area exists between the non-inverted first scan data and the inverted second scan data after the first scan and the second scan are completed. For example, the electronic device 100 may determine whether an overlapping area exists between the non-inverted first scan data and the inverted second scan data in real time while performing the second scan.

According to various embodiments, in operation 850, if an overlapping area exists, the electronic device 100 may generate a three-dimensional embossed image model for the oral cavity of the subject by aligning the inverted second scan data and the non-inverted first scan data, based on the overlapping area. The inverted second scan data and the non-inverted first scan data are both embossed images, and may thus be aligned with each other.

When the engraved second scan data for an impression model, among first scan data and second scan data, is inverted as in FIG. 8, a three-dimensional embossed image model for the oral cavity of the subject may be generated by performing the inversion operation once.

Figure 9:
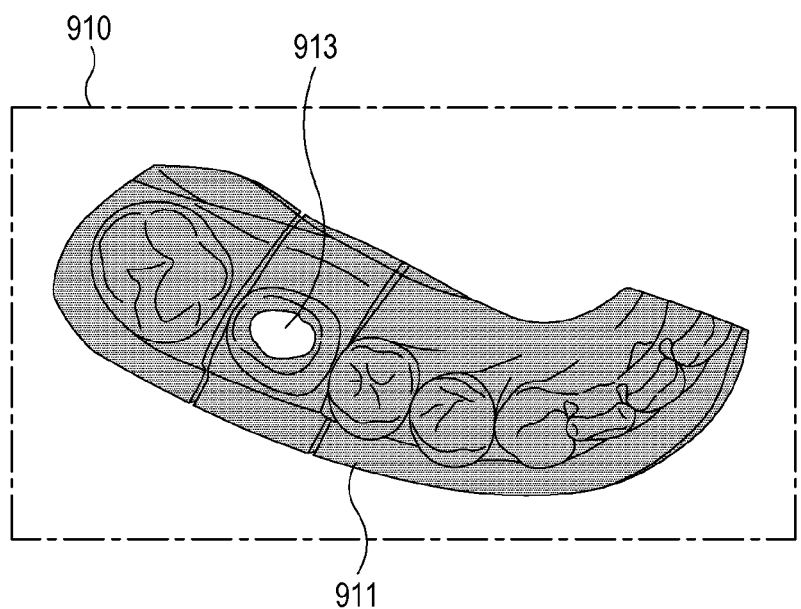
FIG. 9 illustrates first scan data acquired by a first scan performed by a three-dimensional scanner for scanning the oral cavity of a subject according to various embodiments of the present disclosure.

FIG. 9 illustrates first scan data 910 acquired by a first scan performed by the three-dimensional scanner 200 for scanning the oral cavity of a subject according to various embodiments of the present disclosure. A user may scan the oral cavity of the subject by using the three-dimensional scanner 200, and the electronic device 100 may acquire the first scan data 910 obtained by scanning the oral cavity of the subject through the three-dimensional scanner 200. The acquired first scan data 910 may be an embossed image having the same shape as the oral cavity of the subject. The first scan data 910 acquired by scanning the oral cavity of the subject includes scan data 911 for most tooth areas and gum areas, but scan data 913 for a specific part may not be included and may be displayed as an empty area for various reasons described above.

Figure 10A:
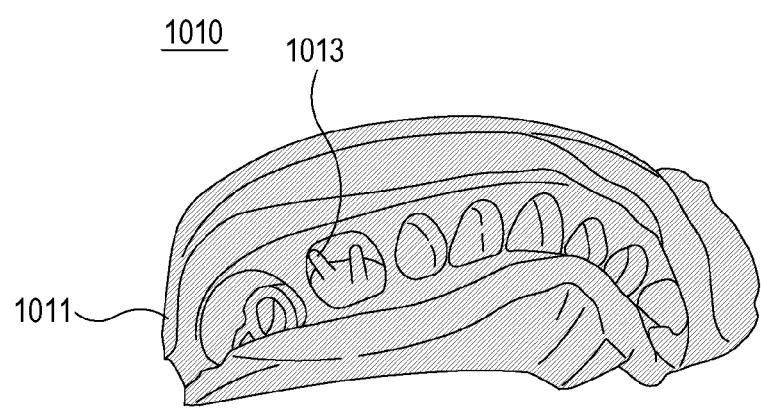
FIG. 10A illustrates an impression model modeled on the oral cavity of a subject according to various embodiments of the present disclosure.

FIG. 10A illustrates an impression model modeled on the oral cavity of a subject according to various embodiments of the present disclosure. Descriptions identical to those made with reference to FIG. 5A and FIG. 5B will be omitted herein. As in FIG. 10A, protruding parts in tooth areas and gum areas of the subject may have recessed shapes 1011 in the impression model 1010, and recessed parts (for example, a part displayed as an empty area in first scan data) of the subject may have protruding shapes 1013 in the impression model.

Figure 10B:
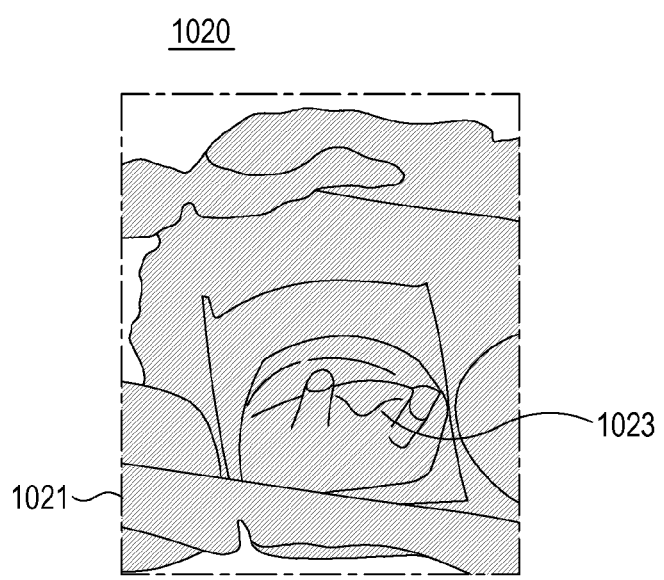
FIG. 10B illustrates second scan data obtained by scanning an impression model according to various embodiments of the present disclosure.

FIG. 10B illustrates second scan data 1020 obtained by scanning an impression model 1010. Referring to FIG. 10B, the electronic device 100 may acquire the second scan data 1020 by a second scan performed by the three-dimensional scanner 200 which scans the impression model 1010. The user may scan the impression model 1010 with the three-dimensional scanner 200 in order to supplement an empty area in the first scan data 910. The second scan data 1020 may include scan data 1023 for a specific part not included in the first scan data 910, and may include scan data 1021 for parts of tooth areas and gum areas included in the first scan data 910. The scan data 1021 for parts of tooth areas and gum areas of the second scan data 1020 may be used to perform alignment with the first scan data 910. The acquired second scan data 1020 may be an engraved image having the same shape as the impression model 1010.

Figure 10C:
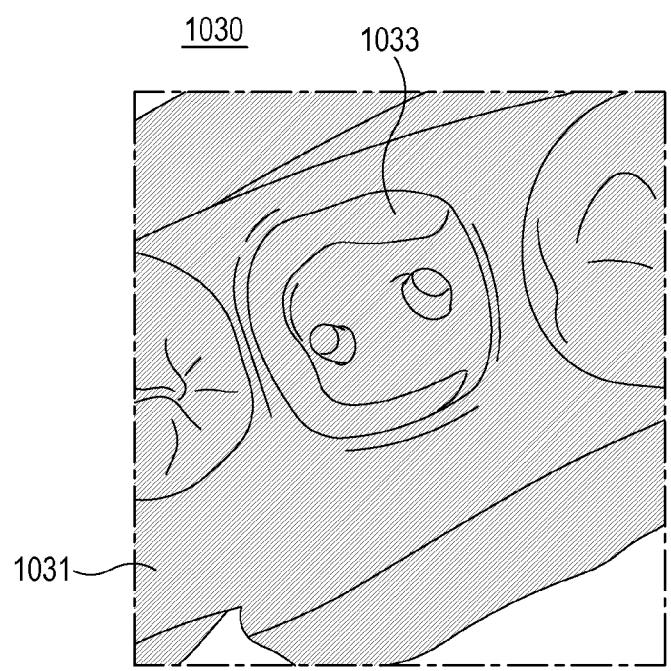
FIG. 10C illustrates inverted second scan data according to various embodiments of the present disclosure.

FIG. 10C illustrates inverted second scan data 1030. The electronic device 100 may invert the second scan data 1020 by using a scheme in which a vertex normal is inverted. By using this scheme, the engraved second scan data 1020 may be inverted to embossed scan data. The inverted second scan data 1030 may also include scan data 1033 for a specific part not included in the first scan data 910, and may include scan data 1031 for tooth and gum areas included in the first scan data. The scan data 1031 corresponding to areas included in the first scan data 910 may be used to align the first scan data 910 and the inverted second scan data 1030. The second scan data 1020 is an engraved image, and the inverted second scan data 1030 is an embossed image.

Figure 11:
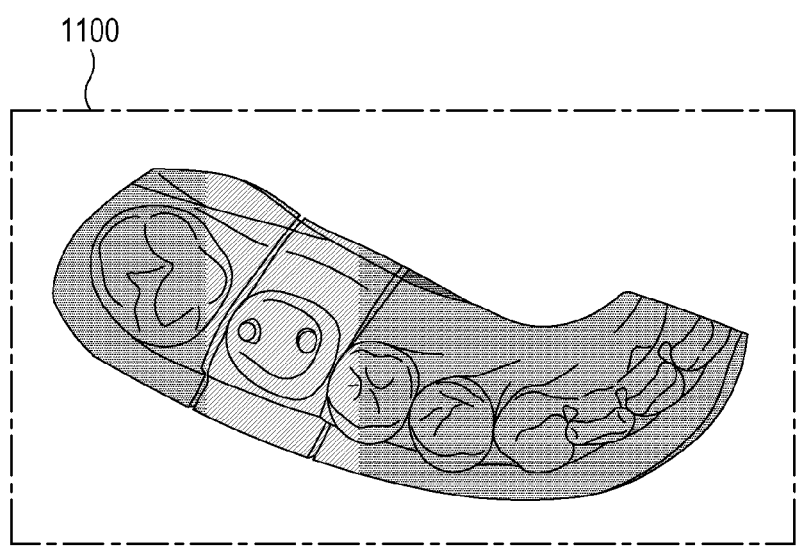
FIG. 11 a three-dimensional image model for the oral cavity of a subject generated by combining first scan data and inverted second scan data.

FIG. 11 illustrates a three-dimensional image model 1100 for the oral cavity of the subject generated by combining the first scan data 910 and the inverted second scan data 1030. The electronic device 100 may generate the three-dimensional image model 1100 for the oral cavity of the subject by aligning the inverted second scan data 1030 and the non-inverted first scan data 910. The first scan data 910 and the inverted second scan data 1030 are both embossed images and thus can be combined with each other, and the three-dimensional image model 1100 generated by aligning the first scan data 910 and the inverted second scan data 1030 may be a three-dimensional embossed image model. For example, the electronic device 100 may determine whether an overlapping area exists between the first scan data 910 and the inverted second scan data 1030 after completing the first scan and the second scan. For example, the electronic device 100 may determine in real time whether an overlapping area exists between the first scan data 910 and the inverted second scan data 1030 while performing the second scan and, if an overlapping area exists, may align the first scan data 910 and the inverted second scan data 1030 based on the overlapping area. For example, scan data 1031 for tooth areas and gum areas included in the inverted second scan data 1030 corresponds to an area overlapping scan data 911 for tooth areas and gum areas of the first scan data 910, and the first scan data 910 and the inverted second scan data 1030 may be aligned with each other based on the overlapping area.

Figure 12:
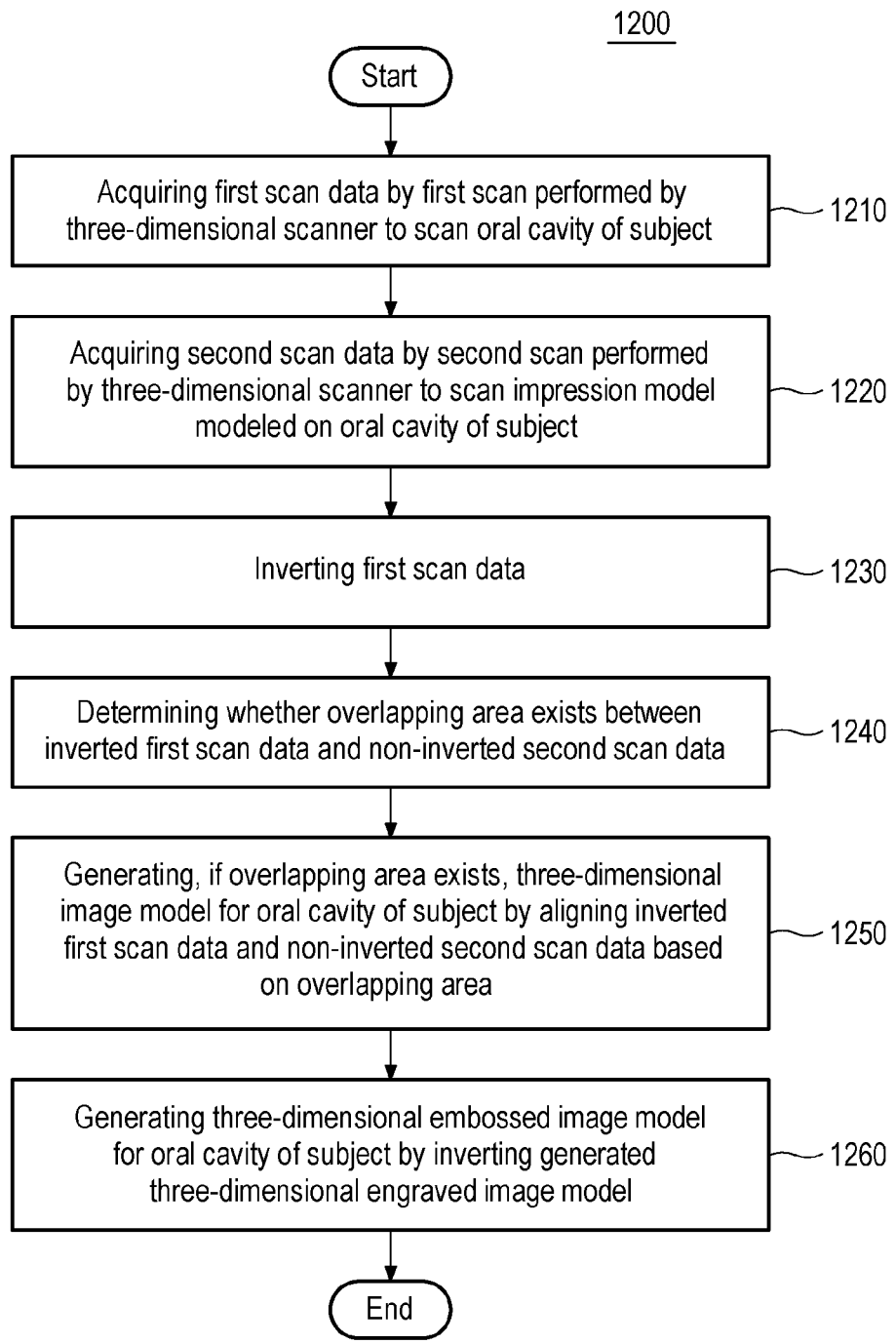
FIG. 12 is a flowchart illustrating operations of an electronic device in connection with inverting first scan data.

FIG. 12 to FIG. 15 illustrate a method for generating a three-dimensional image model in connection with inverting first scan data according to various embodiments of the present disclosure. Specifically, FIG. 12 is a flowchart illustrating operations of the electronic device 100 in connection with inverting the first scan data. Descriptions identical those made with reference to FIG. 7 will be omitted herein.

Referring the operation flowchart 1200, in operation 1210, the electronic device 100 according to various embodiments may acquire the first scan data by a first scan performed by the three-dimensional scanner 200 which scans the oral cavity of a subject. According to various embodiments, in operation 1220, the electronic device 100 may acquire second scan data by a second scan performed by the three-dimensional scanner 200 which scans an impression model modeled on the oral cavity of the subject.

According to various embodiments, in operation 1230, the electronic device 100 may invert the first scan data. For example, the electronic device 100 may invert the first scan data after the first scan and the second scan are completed. For example, the electronic device 100 may invert the first scan data in real time while performing the second scan. The first scan data is an embossed image, and the inverted first scan data may thus be an engraved image.

According to various embodiments, in operation 1240, the electronic device 100 may determine whether an overlapping area exists between the inverted first scan data and the non-inverted second scan data. For example, the electronic device 100 may determine whether an overlapping area exists between the inverted first scan data and the non-inverted second scan data after the first scan and the second scan are completed. For example, the electronic device 100 may determine in real time whether an overlapping area exists between the inverted first scan data and the non-inverted second scan data while performing the second scan.

According to an embodiment, it has been assumed in the operation flowchart 1200 that the first scan data is inverted after the second scan data is acquired, but the time point at which the first scan data is inverted is not limited thereto. For example, the first scan data may be inverted in response to receiving a user input for starting a second scan by the three-dimensional scanner 200 through the input device 109. In this case, the second scan data may be acquired by the second scan after the first scan data is inverted. For example, the electronic device 100 may determine in real time whether an overlapping area exists between the inverted first scan data and the non-inverted second scan data while performing the second scan. If the overlapping area does not exist between the inverted first scan data and the non-inverted second scan data, the electronic device 100 may separately store the inverted first scan data and the non-inverted second scan data, and may display the inverted first scan data and the non-inverted second scan data through the display 107.

According to various embodiments, in operation 1250, if an overlapping area exists, the electronic device 100 may generate a three-dimensional image model for the oral cavity of the subject by aligning the inverted first scan data and the non-inverted second scan data based on the overlapping area. The inverted first scan data and the non-inverted second scan data are both engraved images, and thus may be aligned with each other. The three-dimensional image model for the oral cavity of the subject generated by aligning the inverted first scan data and the non-inverted second scan data may be a three-dimensional engraved image model.

According to various embodiments, in operation 1260, the electronic device 100 may generate a three-dimensional embossed image model for the oral cavity of the subject by inverting the generated three-dimensional engraved image model. The electronic device 100 may display the generated three-dimensional embossed image model through the display 107.

Figure 13:
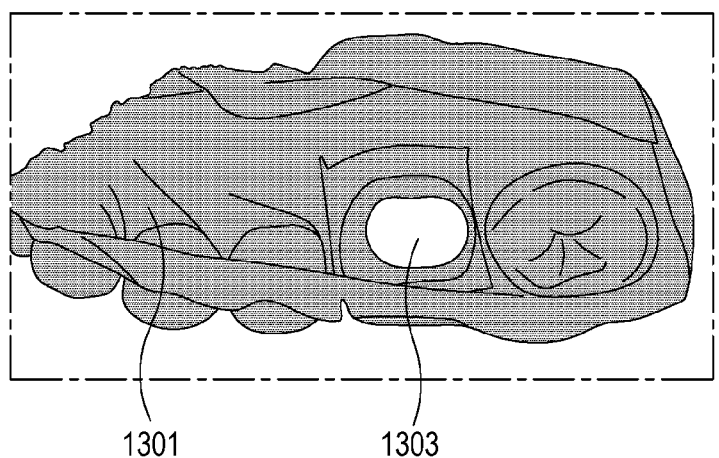
FIG. 13 illustrates inverted first scan data.

FIG. 13 illustrates inverted first scan data 1300. Specifically, the inverted first scan data 1300 in FIG. 13 may be acquired by inverting the first scan data 910 illustrated in FIG. 9. The first scan data 910 is an embossed image, and the inverted first scan data 1300 may thus be an engraved image. The first scan data 910 includes scan data 911 for most tooth areas and gum areas, but does not include scan data 913 for a specific part, which may be displayed as an empty area. Accordingly, the inverted first scan data 1300 includes scan data 1301 for most tooth areas and gum areas, but does not include scan data 1303 for a specific part, which may be displayed as an empty area.

Figure 14:
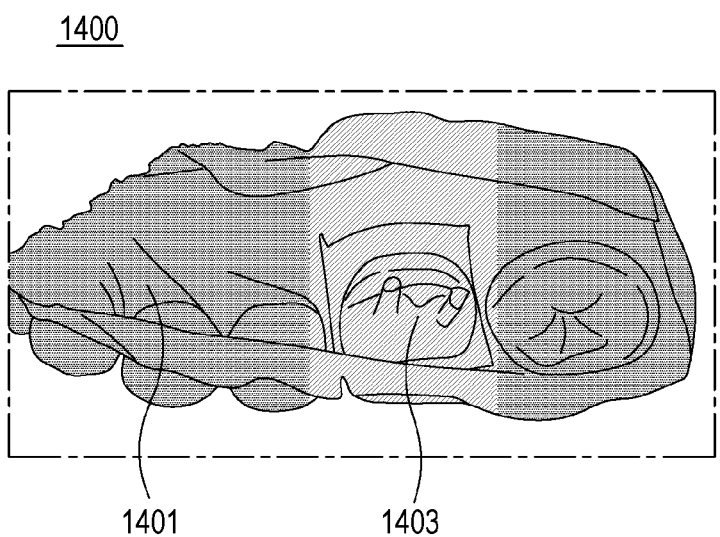
FIG. 14 illustrates a three-dimensional engraved image model for the oral cavity of a subject.
Figure 15:
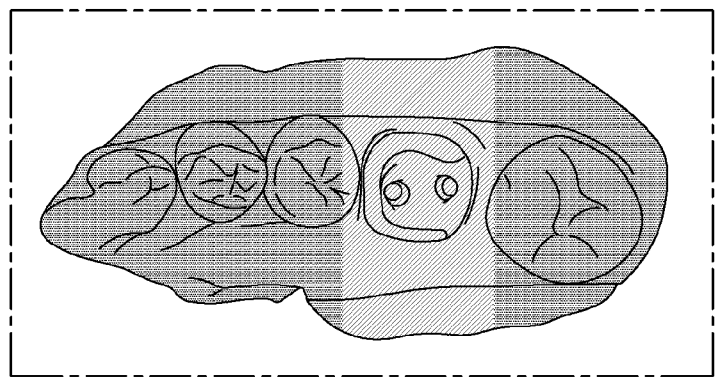
FIG. 15 illustrates a three-dimensional embossed image model for the oral cavity of a subject.

FIG. 14 illustrates a three-dimensional engraved image model 1400 for the oral cavity of a subject, and FIG. 15 illustrates a three-dimensional embossed image model 1500 for the oral cavity of the subject. The electronic device 100 may generate the three-dimensional engraved image model for the oral cavity of the subject by combining inverted first scan data and non-inverted second scan data. For example, the electronic device 100 may generate a three-dimensional engraved image model 1400 for the oral cavity of the subject by aligning the inverted first scan data 1300 illustrated in FIG. 13 and the non-inverted second scan data 1020 illustrated in FIG. 10B. The inverted first scan data 1300 and the non-inverted second scan data 1020 are both engraved images, and may thus be aligned with each other. As in FIG. 15, the electronic device 100 may acquire a three-dimensional embossed image model 1500 of the subject by inverting the three-dimensional engraved image model 1400 of the subject. The electronic device 100 may display the three-dimensional embossed image model 1500 of the subject through the display 107.

It has been assumed in the above description that the second scan data is acquired after the first scan data is acquired, but this assumption is only for convenience of description, and the order of acquiring the first scan data and the second scan data may be changed. Specifically, the first scan data and the second scan data are separately stored and when a three-dimensional image model for the oral cavity of the subject is generated, the separately stored first scan data and second scan data are aligned with each other, making it unnecessary to acquire the first scan data first. For example, the electronic device 100 may first acquire scan data for an impression model, may acquire scan data for the oral cavity thereafter, and may invert one of the first scan data and the second scan data. In this case, the electronic device 100 may invert one of the first scan data and the second scan data in real time while performing the first scan. The electronic device 100 may determine in real time whether an overlapping area exists between the inverted scan data and the non-inverted scan data while performing the first scan and, when an overlapping area exists, may align the inverted scan data and the non-inverted scan data based on the overlapping area. The method for generating a three-dimensional image model of the subject thereafter is the same as described above.

According to various embodiments of the present disclosure, when scan data for a specific part fails to be acquired by scanning the oral cavity of the subject, an impression model modeled on the oral cavity of the subject may be scanned, thereby acquiring scan data for the specific part. Scan data acquired by scanning the oral cavity and scan data acquired by scanning the impression model modeled on the oral cavity may be aligned and combined with each other, thereby generating a three-dimensional image model for the oral cavity.

According to various embodiments of the present disclosure, scan data for an oral cavity of a subject (oral cavity scan data) and scan data for an impression model modeled on the oral cavity of the subject (impression scan data) may be separately acquired and then combined with each other, thereby increasing the degree of freedom in connection with the alignment time point and scanning of the impression scan data.

Although technical features of the present disclosure have been described in connection with some embodiments and examples illustrated in the accompanying drawings, it is to be understood that various substitutions, modifications, and changes can be made without deviating from the technical scope of the present disclosure which can be understood by those skilled in the art to which the present disclosure pertains. In addition, such substitutions, modifications, and changes are to be considered as falling within the scope of the following claims.

What is claimed is:

1. An electronic device comprising:
a communication circuit configured to be communicatively connected to a three-dimensional scanner;
at least one memory; and
at least one processor,
wherein the at least one processor is configured to:
generate first scan data indicating a plurality of three-dimensional points based on two-dimensional images acquired by a first scan performed by the three-dimensional scanner to scan an oral cavity of a subject;
generate second scan data indicating a plurality of three-dimensional points based on two-dimensional images acquired by a second scan performed by the three-dimensional scanner to scan an impression model modeled on the oral cavity of the subject;
invert one of the first scan data and the second scan data;
determine whether an overlapping area exists between inverted scan data and non-inverted scan data, among the first scan data and the second scan data; and
generate, if the overlapping area exists, a three-dimensional image model for the oral cavity of the subject by aligning the inverted scan data and the non-inverted scan data based on the overlapping area.

2. The electronic device of claim 1, wherein the at least one processor is configured to store, if the overlapping area does not exist, the first scan data and the second scan data in the at least one memory.

3. The electronic device of claim 1, wherein the at least one processor is configured to:
determine, if the second scan data has been inverted, whether an overlapping area exists between the non-inverted first scan data and the inverted second scan data; and
generate, if the overlapping area exists, a three-dimensional embossed image model for the oral cavity of the subject by aligning the inverted second scan data and the non-inverted first scan data based on the overlapping area.

4. The electronic device of claim 1, wherein the at least one processor is configured to:
identify the second scan data which is scan data for the impression model among the first scan data and the second scan data based on information about the first scan data and the second scan data; and
invert one of the first scan data and the second scan data based on a result of the identification.

5. The electronic device of claim 4, wherein the information about the first scan data and the second scan data comprises at least one of color, shape, and texture of the first scan data and the second scan data.

6. The electronic device of claim 1, wherein the at least one processor is configured to:
determine, if the first scan data has been inverted, whether an overlapping area exists between the inverted first scan data and the non-inverted second scan data;
generate, if the overlapping area exists, a three-dimensional engraved image model for the oral cavity of the subject by aligning the inverted first scan data and the non-inverted second scan data based on the overlapping area; and
generate a three-dimensional embossed image model for the oral cavity of the subject by inverting the three-dimensional engraved image model.

7. The electronic device of claim 6, further comprising an input device,
wherein the at least one processor is configured to:
invert the first scan data in response to receiving a user input for starting the second scan by the three-dimensional scanner through the input device; and
acquire the second scan data by the second scan after inverting the first scan data.

8. The electronic device of claim 7, further comprising a display,
wherein the at least one processor is configured to:
display the inverted first scan data and the non-inverted second scan data through the display before performing alignment between the inverted first scan data and the non-inverted second scan data; and
display the three-dimensional engraved image model for the oral cavity of the subject through the display after performing the alignment.

9. The electronic device of claim 1, wherein the at least one processor is configured to invert one of the first scan data and the second scan data in real time while performing the second scan.

10. The electronic device of claim 1, wherein the plurality of three-dimensional points of the first scan data and the second scan data comprise a plurality of three-dimensional coordinate values, and
wherein the at least one processor is configured to invert one of the first scan data and the second scan data by inverting a vertex normal.

11. A method for processing a scan image by an electronic device, the method comprising:
generating first scan data indicating a plurality of three-dimensional points based on two-dimensional images acquired by a first scan performed by a three-dimensional scanner to scan an oral cavity of a subject;
generating second scan data indicating a plurality of three-dimensional points based on two-dimensional images acquired by a second scan performed by the three-dimensional scanner to scan an impression model modeled on the oral cavity of the subject;
inverting one of the first scan data and the second scan data;

determining whether an overlapping area exists between inverted scan data and non-inverted scan data, among the first scan data and the second scan data; and generating, if the overlapping area exists, a three-dimensional image model for the oral cavity of the subject by aligning the inverted scan data and the non-inverted scan data based on the overlapping area.

12. The method of claim 11, further comprising storing, if the overlapping area does not exist, the first scan data and the second scan data.

13. The method of claim 11, wherein the generating the three-dimensional image model comprises:

determining, if the second scan data has been inverted, whether an overlapping area exists between the non-inverted first scan data and the inverted second scan data; and generating, if the overlapping area exists, a three-dimensional embossed image model for the oral cavity of the subject by aligning the inverted second scan data and the non-inverted first scan data based on the overlapping area.

14. The method of claim 11, wherein the inverting one of the first scan data and the second scan data comprises:

identifying the second scan data which is scan data for the impression model among the first scan data and the second scan data based on information about the first scan data and the second scan data; and inverting one of the first scan data and the second scan data based on a result of the identification.

15. The method of claim 14, wherein the information about the first scan data and the second scan data comprises at least one of color, shape, and texture of the first scan data and the second scan data.

16. The method of claim 11, wherein the generating the three-dimensional image model comprises:

determining, if the first scan data has been inverted, whether an overlapping area exists between the inverted first scan data and the non-inverted second scan data;

generating, if the overlapping area exists, a three-dimensional engraved image model for the oral cavity of the subject by aligning the inverted first scan data and the non-inverted second scan data based on the overlapping area; and generating a three-dimensional embossed image model for the oral cavity of the subject by inverting the three-dimensional engraved image model.

17. The method of claim 16, further comprising inverting the first scan data in response to receiving a user input for starting the second scan by the three-dimensional scanner, wherein the acquiring the second scan data comprises acquiring the second scan data by the second scan after inverting the first scan data.

18. The method of claim 17, further comprising:

displaying the inverted first scan data and the non-inverted second scan data before performing alignment between the inverted first scan data and the non-inverted second scan data; and displaying the three-dimensional engraved image model for the oral cavity of the subject after performing the alignment.

19. The method of claim 11, wherein the act of inverting comprises inverting one of the first scan data and the second scan data in real time while performing the second scan.

20. The method of claim 11, wherein the plurality of three-dimensional points of the first scan data and the second scan data comprise a plurality of three-dimensional coordinate values, and wherein the act of inverting is performed by inverting a vertex normal.

\* \* \* \* \*